United States Patent
Ji et al.

(10) Patent No.: US 11,405,938 B2
(45) Date of Patent: Aug. 2, 2022

(54) RESOURCE CONFIGURATION METHOD, RESOURCE DETERMINATION METHOD, APPARATUSES THEREOF AND COMMUNICATION SYSTEM

(71) Applicant: FUJITSU LIMITED, Kawasaki (JP)

(72) Inventors: Pengyu Ji, Beijing (CN); Jian Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 16/800,556

(22) Filed: Feb. 25, 2020

(65) Prior Publication Data

US 2020/0196324 A1    Jun. 18, 2020

Related U.S. Application Data

(63) Continuation of application No. PCT/CN2017/101027, filed on Sep. 8, 2017.

(51) Int. Cl.
*H04W 72/12* (2009.01)
*H04W 76/27* (2018.01)
*H04L 1/16* (2006.01)
*H04W 72/04* (2009.01)

(52) U.S. Cl.
CPC ........ *H04W 72/121* (2013.01); *H04L 1/1614* (2013.01); *H04W 72/042* (2013.01); *H04W 76/27* (2018.02)

(58) Field of Classification Search
CPC . H04W 72/121; H04W 76/27; H04W 72/042; H04W 72/1284; H04W 72/00; H04W 72/048; H04W 88/04; H04L 1/1614; H04L 5/0096; H04L 5/0048

See application file for complete search history.

(56) References Cited

U.S. PATENT DOCUMENTS

| | | | |
|---|---|---|---|
| 2009/0069023 A1 | 3/2009 | Ahn et al. | |
| 2018/0091959 A1* | 3/2018 | Sun | H04W 88/04 |
| 2018/0227905 A1* | 8/2018 | Zhou | H04W 72/048 |
| 2019/0053318 A1* | 2/2019 | Nogami | H04L 5/0096 |
| 2020/0205142 A1* | 6/2020 | Gao | H04L 5/0048 |

OTHER PUBLICATIONS

Extended European Search Report issued by the European Patent Office for corresponding European Patent Application No. 17924724.2 dated Jul. 29, 2020.

Samsung, "Multiplexing NR-PDCCH and PDSCH", 3GPP TSG RAN WG1 Meeting #90; Agenda Item 6.1.3.1.3 RI-1713615, pp. 1-4, Prague, Czech Republic, Aug. 21-25, 2017.

(Continued)

*Primary Examiner* — Kiet Tang
(74) *Attorney, Agent, or Firm* — Myers Wolin, LLC.

(57) ABSTRACT

A resource configuration method, resource determination method, apparatuses thereof and communication system. The resource configuration apparatus comprises: a first configuring unit configured to configure one or more additional resource sets corresponding to each control resource set or each group of control resource sets. Hence, payload of downlink control information may be reduced, and currently existed problems may be solved.

13 Claims, 9 Drawing Sheets

(56) References Cited

OTHER PUBLICATIONS

Intel Corporation, "Dynamic resource sharing of control and data channel", 3GPP TSG RAN WG1 Meeting #90; Agenda item: 6.1.3.1.3, R1-1712571, Prague, Czech Republic, Aug. 21-25, 2017.
Catt, "Flexible reuse of DL control resources for data transmission", 3GPP TSG RAN WG1 Meeting #90; Agenda item: 6.1.3.1.3, R1-1712395, Prague, Czech Republic, Aug. 21-25, 2017.
Notice of Reasons for Refusal issued by the Japan Patent Office for corresponding Japanese Patent Application No. 2020-512720, dated May 25, 2021, with an English translation.
The International Search Report issued for corresponding International Patent Application No. PCT/CN2017/101027, dated May 30, 2018, with an English translation.
Written Opinions of The International Searching Authority issued for corresponding International Patent Application No. PCT/CN2017/101027, dated May 30, 2018, with an English translation.
Catt "Configuration aspects of the NR-PDCCH", Agenda Item: 6.1.3.1.2.1, 3GPP TSG-RAN WG1 Meeting #90, R1-1712392, Prague, Czechia, Aug. 21-25, 2017.
Mediatek Inc. "Design of Search Space", Agenda Item: 8.1.3.1.4, 3GPP TSG-RAN WG1 Meeting #88bis, R1-1704444, Spokane, USA, Apr. 3-7, 2017.
Intel Corporation "Resource allocation for PUCCH during initial access", Agenda Item: 6.1.3.2.4, 3GPP TSG-RAN WG1 Meeting #90, R1-1712583, Prague, Czechia, Aug. 21-25, 2017.
Intel Corporation "Resource allocation for NR uplink control channel", Agenda Item: 8.1.3.2.3, 3GPP TSG-RAN WG1 Meeting #88bis, R1-1704753, Spokane, USA, Apr. 3-7, 2017.
Communication pursuant to Article 94(3) EPC issued by the European Patent Office for corresponding European Patent Application No. 17 924 724.2, dated Mar. 17, 2022.
NTT Docomo, Inc., "Resource sharing between data and control channels", Agenda Item: 5.1.3.1.3, 3GPP TSG RAN WG1 NR Ad-Hoc#2, R1-1711093, Qingdao, P.R. China, Jun. 27-30, 2017.

* cited by examiner

RESOURCE CONFIGURATION METHOD, RESOURCE DETERMINATION METHOD, APPARATUSES THEREOF AND COMMUNICATION SYSTEM

CROSS REFERENCE TO RELATED APPLICATIONS

This application is a continuation application of International Application No. PCT/CN2017/101027, filed on Sep. 8, 2017, the contents of which are incorporated herein by reference.

TECHNICAL FIELD

This disclosure relates to the field of communication technologies, and in particular to a resource configuration method, a resource determination method, apparatuses thereof and a communication system.

BACKGROUND

In future wireless communication systems, such as 5G and New Radio (NR) systems, a network side configures a control resource set (CORESET) for a user equipment (UE). After performing beam sweeping at a UE side, a physical downlink control channel (PDCCH) in the control resource set needs to be detected. Downlink data carried by a physical downlink shared channel (PDSCH) are received or uplink data carried by a physical uplink shared channel (PUSCH) are transmitted according to a scheduling indication unit of the detected PDCCH.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the current discussion, some control resources may be used via a PDSCH to obtain higher frequency efficiency and/or lower latency. Thus, after the above CORESET is configured, some additional resource sets may be configured for the UE. Furthermore, whether an operation executed on the above CORESET and the additional resource sets is "rate matching" or "data mapping" is indicated by downlink control information in a PDCCH.

In the current discussion, the above-described additional resource sets are UE-specific configuration, that is, the additional resource sets correspond to a specific UE. Therefore, when the UE is configured to detect multiple CORESETs, downlink control information in a PDCCH in each CORESET needs to indicate all the above additional resource sets configured for the UE. However, since resources scheduled by the PDCCH in each CORESET may be different, the above indication mode will increase the overhead of the downlink control information.

In order to solve the above problem, embodiments of this disclosure provide a resource configuration method, a resource determination method, apparatuses thereof and a communication system, which may reduce payload of downlink control information, and solve currently existed problems.

According to a first aspect of the embodiments of this disclosure, there is provided a resource configuration apparatus, including:
a first configuring unit configured to configure one or more additional resource sets corresponding to each control resource set or each group of control resource sets.

According to a second aspect of the embodiments of this disclosure, there is provided a resource determination apparatus, including:
a first determining unit configured to determine one or more additional resource sets configured by a network side and corresponding to each control resource set or each group of control resource sets; and
a processing unit configured to perform a corresponding operation on the one or more additional resource sets corresponding to each control resource set or each group of control resource sets.

According to a third aspect of the embodiments of this disclosure, there is provided a resource configuration method, including:
configuring one or more additional resource sets corresponding to each control resource set or each group of control resource sets.

According to a fourth aspect of the embodiments of this disclosure, there is provided a resource determination method, including:
determining one or more additional resource sets configured by a network side and corresponding to each control resource set or each group of control resource sets; and
performing a corresponding operation on the one or more additional resource sets corresponding to each control resource set or each group of control resource sets.

The advantages of the embodiments of this disclosure according to the embodiments of this disclosure are, by configuring one or more additional resource sets corresponding to each control resource set or each group of control resource sets, that is, by specifically configuring additional resource sets for the control resource sets, payload of downlink control information may be reduced, and currently existed problems may be solved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a schematic diagram of an additional resource set configured in the relevant art;

FIG. 2 is a flowchart of the resource configuration method in Embodiment 1;

FIG. 3A is a schematic diagram of an additional resource sets configured in Embodiment 1;

FIG. 3B is a schematic diagram of an additional resource sets configured in Embodiment 1;

FIG. 4 is a schematic diagram of an additional resource set configured in Embodiment 1;

FIG. 5 is a flowchart of the resource configuration method in Embodiment 2;

FIG. 6 is a flowchart of the resource determination method in Embodiment 3;

FIG. 7 is a schematic diagram of a structure of the resource configuration apparatus in Embodiment 4;

FIG. 8 is a schematic diagram of a structure of the network device in Embodiment 5;

FIG. 9 is a schematic diagram of a structure of the resource configuration apparatus in Embodiment 6;

FIG. 10 is a schematic diagram of a structure of the network device in Embodiment 7;

Figure 11:
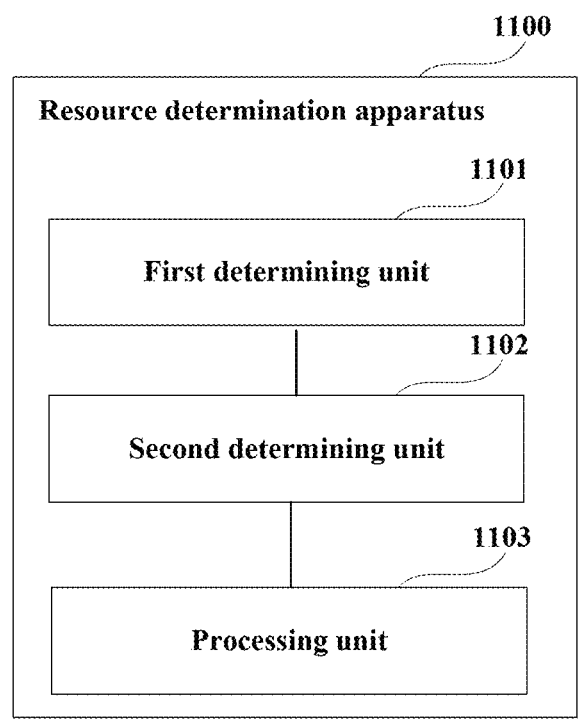
Figure 12:
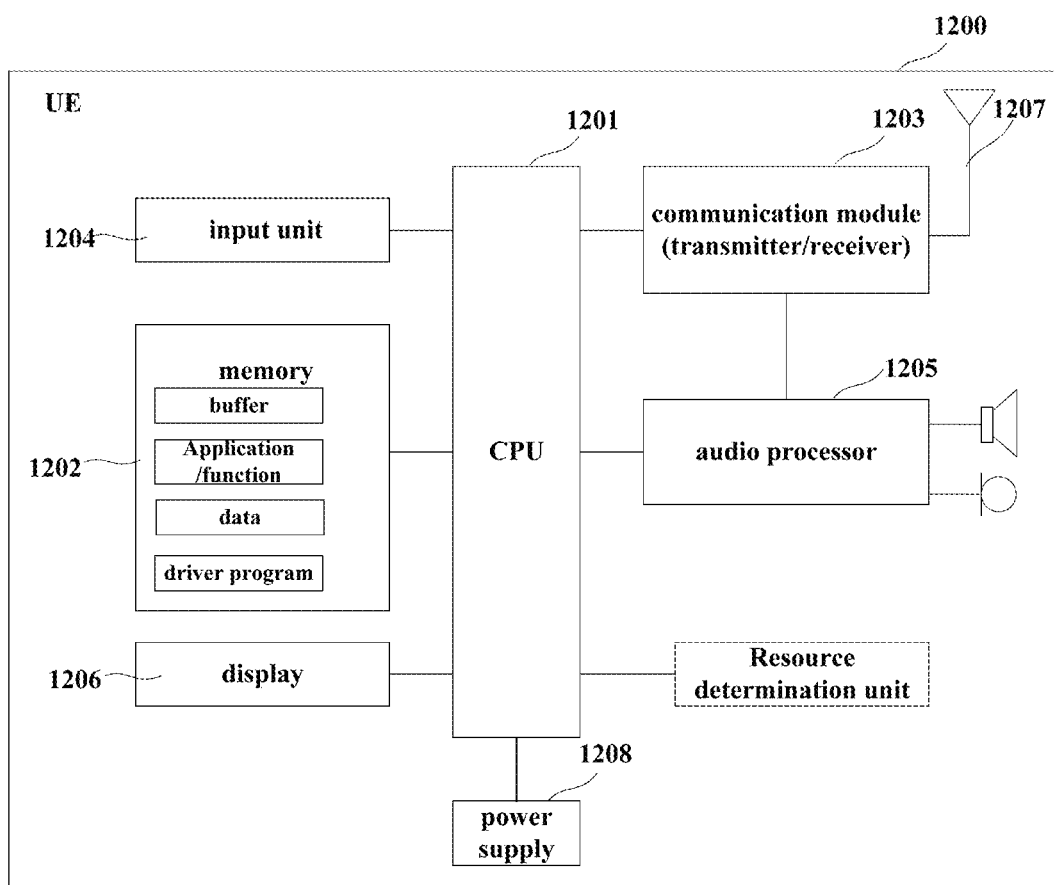
Figure 13:
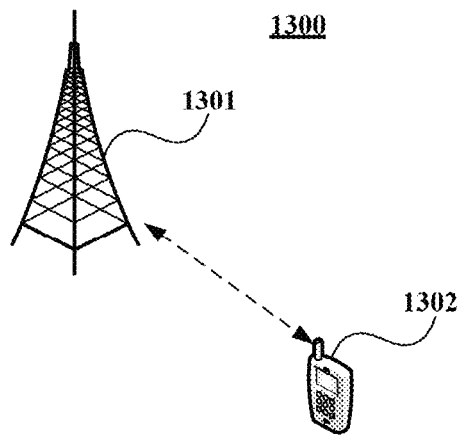
Figure 14:
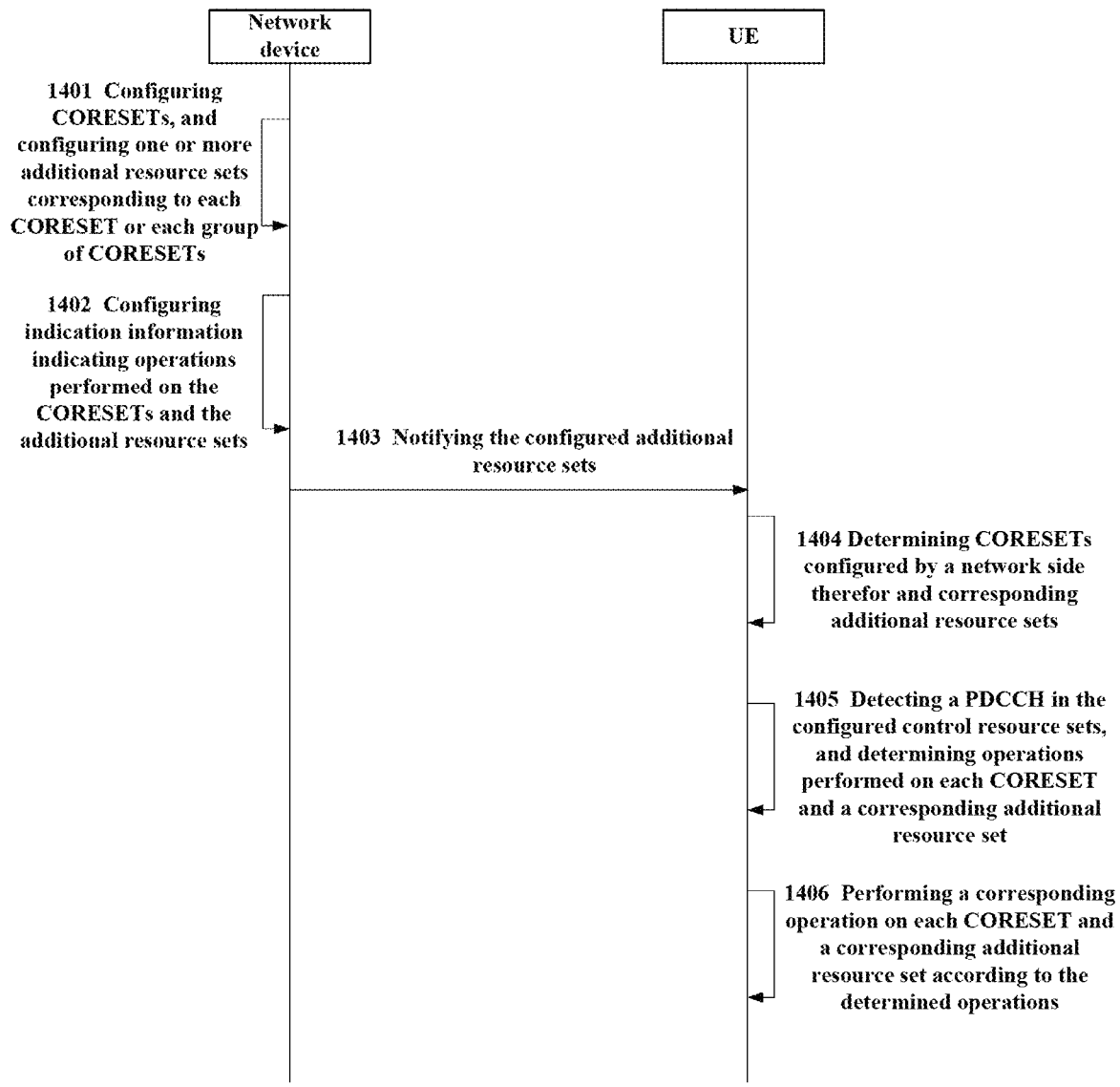
Figure 15:
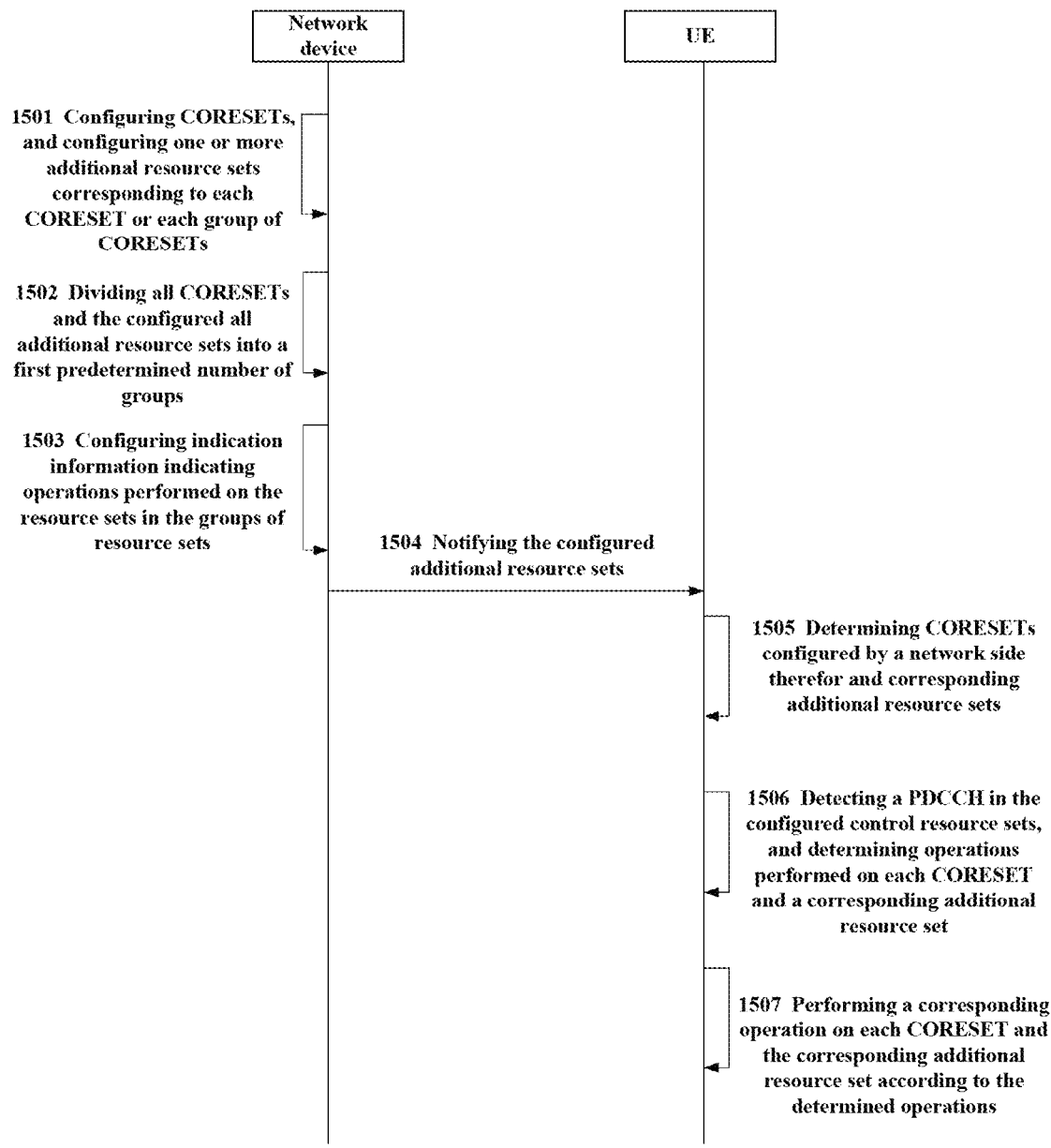

FIG. 11 is a schematic diagram of a structure of the resource determination apparatus in Embodiment 8;

FIG. 12 is a schematic diagram of a structure of the UE in Embodiment 9;

FIG. 13 is a schematic diagram of the communication system in Embodiment 10;

FIG. 14 is a flowchart of the resource configuration and determination method in Embodiment 10; and FIG. 15 is a flowchart of the resource configuration and determination method in Embodiment 10.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Figures 1, 2:
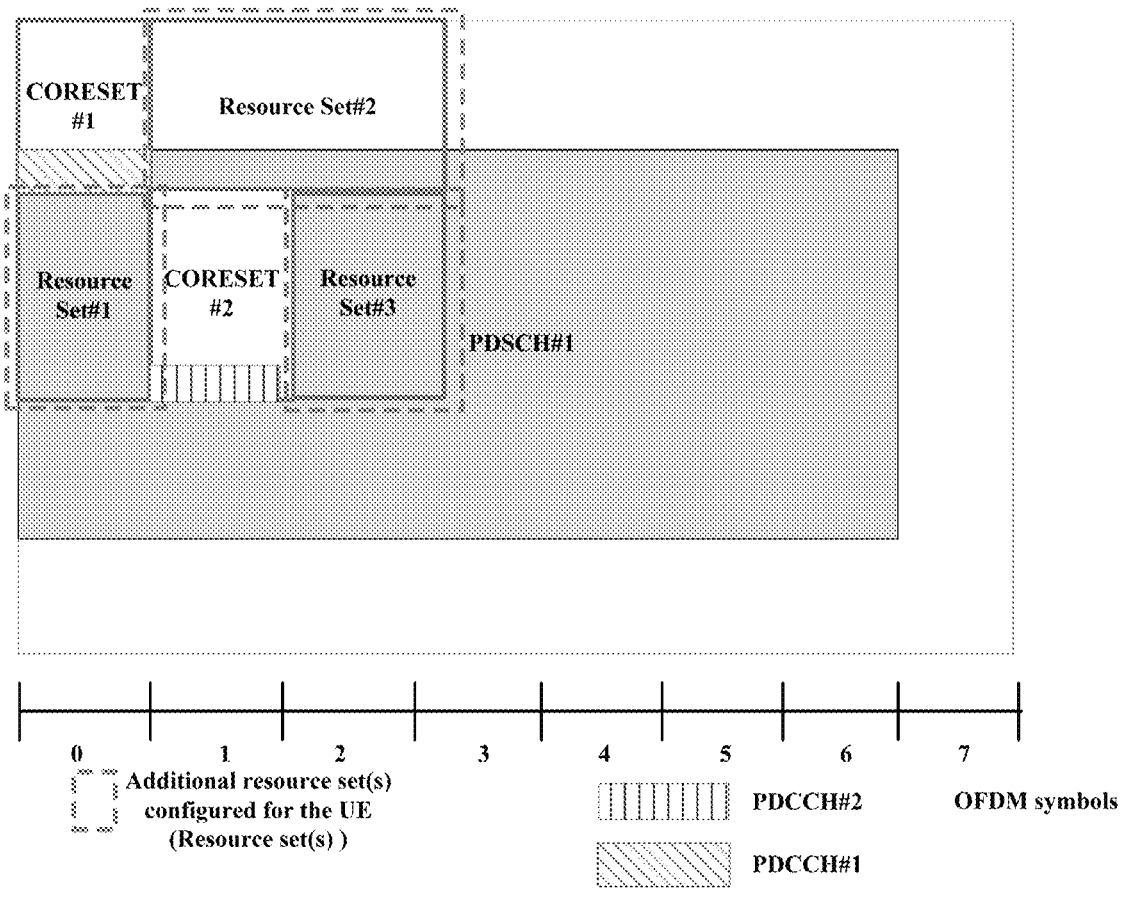

Problems existing in the UE-specific method for configuring additional resource sets in the relevant art will be described below with reference to FIG. 1. FIG. 1 is a schematic diagram of UE-specific configured additional resource sets. As shown in FIG. 1, two control resource sets, CORESET #1 and CORESET #2, which need to be detected, and additional resource sets, Resource set #1, Resource set #2 and Resource set #3, are configured by a network side for the UE; the UE respectively detects PDCCH #1 and PDCCH #2 possibly occurring in CORESET #1 and CORESET #2, and operations executed on CORESET #1 and CORESET #2 as well as Resource set #1, Resource set #2 and Resource set #3 need to be indicated by PDCCH #1 and PDCCH #2; however, for PDCCH #2 in CORESET #2, as positions of CORESET #1 and Resource set #1 are prior to its position, resources scheduled by it will not include CORESET #1 and Resource set #1, and if downlink control information in PDCCH #2 is still directed to the UE-specific configured additional resource sets, 2 bits in a bitmap in the downlink control information will be wasted.

In the embodiments of this disclosure, by configuring one or more additional resource sets corresponding to each control resource set or each group of control resource sets, that is, by specifically configuring additional resource sets for the control resource sets, payload of downlink control information may be reduced, and currently existed problems may be solved.

The embodiments of this disclosure shall be described below with reference to the accompanying drawings.

Embodiment 1

FIG. 2 is a flowchart of the resource configuration method in Embodiment 1, which is applicable to a network device side. As shown in FIG. 2, the method includes:

step 201: a network device side configures one or more additional resource sets corresponding to each control resource set or each group of control resource sets.

It can be seen from the above embodiment that by configuring one or more additional resource sets corresponding to each control resource set or each group of control resource sets, that is, by specifically configuring additional resource sets for the control resource sets, payload of downlink control information may be reduced, and currently existed problems may be solved.

In an embodiment, the method further includes (not shown): the network side configures for the user equipment a control resource set needing to be detected, so that the user equipment obtains scheduling data according to the configured control resource set; each user equipment may be configured with one or more control resource sets, time-domain and frequency-domain size and/or position of each control resource set being able to be configured as needed.

For example, the size of each control resource set includes the number of symbols and control channel elements (CCEs); for example, the size of each control resource set may be configured as being one symbol and 16 CCEs; the time-domain and frequency-domain position of each control resource set includes symbols in a control region of a corresponding slot; for example, a particular time-domain and frequency-domain position may be configured as being M symbols in the corresponding slot (such as former first, second and third symbols). These are illustrative only, and this embodiment is not limited thereto.

In an embodiment, the additional resource set may include all or part of control resources in control resource sets configured for one or more other UEs; and furthermore, it may include other resources, such as resources for transmitting data on a PDSCH and a PUSCH; however, this embodiment is not limited thereto. And higher frequency efficiency and/or lower latency may be obtained via the additional resource set.

In an embodiment, the network side may configure the control resource set and the corresponding additional resource set at the same time, or may configure the control resource set first, and then configure the additional resource set corresponding thereto, and this embodiment is not limited thereto.

In one embodiment, one or more additional resource sets corresponding to each control resource set may be configured, that is, for different CORESETs, one or more additional resource sets corresponding thereto are configured.

For example, the network side configures n CORESETs needing to be detected for the UE, which are CORESET $\#m_1$, CORESET $\#m_2$, ..., CORESET $\#m_n$; where, n is an integer greater than or equal to 1, and $m_n$ denotes an index of the CORESET. The network side configures an additional resource set for each CORESET, as shown in Table 1 below. For example, additional resource sets configured for a CORESET with an index $m_i$ are Resource set $\#m_{i,\ 1}$, Resource set $\#m_{i,\ 2}$ ... Resource set $\#m_{i,\ ki}$, a value range of i being 1~n.

TABLE 1

| CORESET | Configured additional resource set |
|---|---|
| $\#m_1$ | Resource set $\#m_{1,1}$, Resource set $\#m_{1,2}$ ... Resource set $\#m_{1,k1}$ |
| $\#m_2$ | Resource set $\#m_{2,1}$, Resource set $\#_{2,2}$ ... Resource set $\#m_{2,k2}$ |
| ... | ... |
| $\#m_i$ | Resource set $\#m_{i,1}$, Resource set $\#m_{i,2}$ ... Resource set $\#m_{i,ki}$ |
| ... | ... |
| $\#m_n$ | Resource set $\#m_{n,1}$, Resource set $\#m_{n,2}$ ... Resource set $\#m_{n,kn}$ | where, k1, k2, ki, ..., kn are integers greater than or equal to 1, and may be identical or may be different.

Figure 3A:
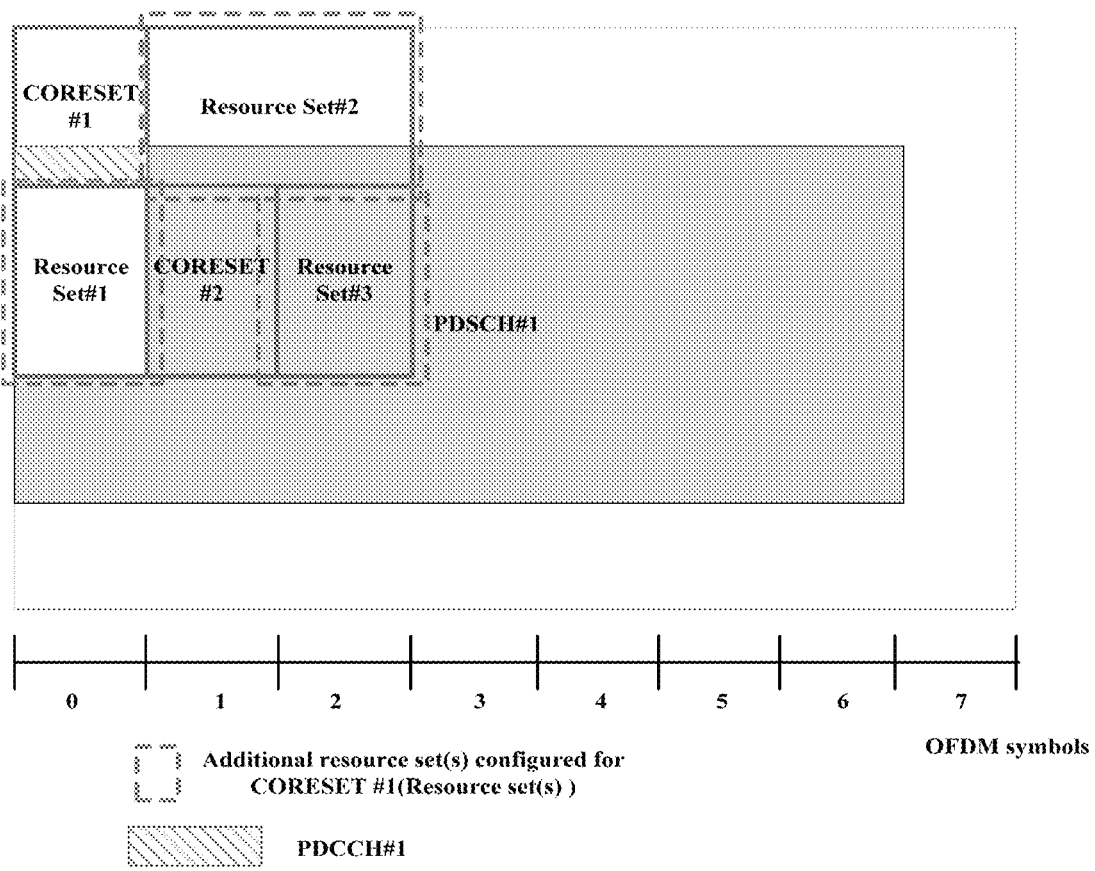
Figure 3B:
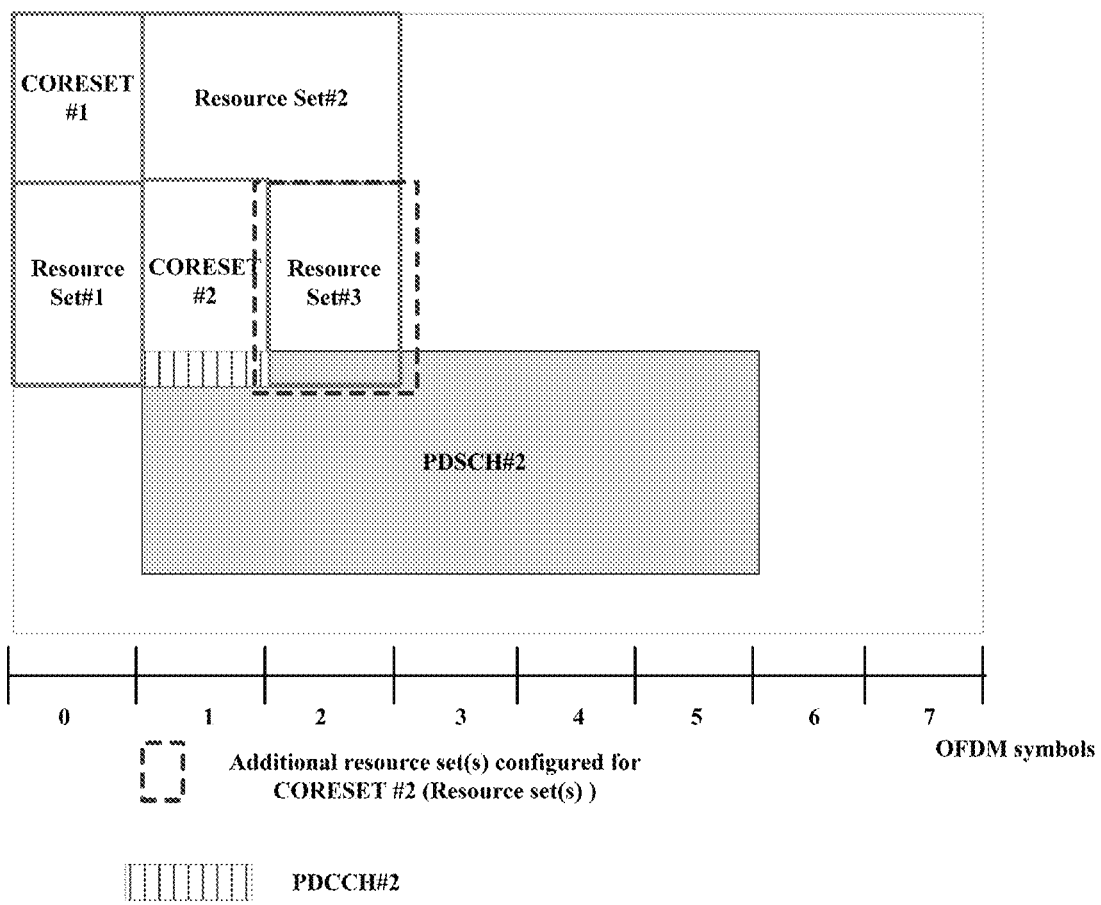

FIGS. 3A and 3B are schematic diagrams of configuring additional resource sets based on CORESETs. As shown in FIGS. 3A and 3B, two CORESETs needing to be detected are configured for the UE, which are CORESET #1 and CORESET #2, respectively. As shown in FIG. 3A, the additional resource sets configured for CORESET #1 are Resource set #1, Resource set #2 and Resource set #3. And as shown in FIG. 3B, the additional resource set configured for CORESET #2 is Resource set #3.

In one embodiment, one or more additional resource sets corresponding to each group of control resource sets may be configured, that is, for different groups of CORESETs, one or more additional resource sets corresponding to the groups of CORESETs are configured.

For example, the network side configures the UE with n CORESETs needing to be detected, which are CORESET $\#m_1$, CORESET $\#m_2$, ..., CORESET $\#m_n$. The n CORESETs are divided into p groups. Second group indices of each group are #1, #2, ..., #p, p being an integer greater than or equal to 1. The number of CORESETs in each group may be identical or different, as shown in Table 2 below. For example, CORESETs close to each other in the time domain and the frequency domain may be divided into a group; however, this embodiment is not limited thereto.

TABLE 2

| Second group indices | CORESETs in a group |
|---|---|
| #1 | CORESET #$m_1$, . . . , CORESET #$m_a$ |
| ... | ... |
| #j | CORESET #$m_b$, . . . , CORESET #$m_c$ |
| ... | ... |
| #p | CORESET #$m_d$, . . . , CORESET #$m_n$ | where, a, b, c and d are integers greater than 1, and are different from each other.

The network side configures additional resource sets for the p groups CORESETs, as shown in Table 3 below. For example, additional resource sets configured for a CORESET with a second group index #j are Resource set #$m_{j,1}$, Resource set #$m_{j,2}$ . . . Resource set #$m_{j,rj}$, a value range of j being 1~p.

TABLE 3

| Second group indices of groups of CORESETs | Configured additional resource sets |
|---|---|
| #1 | Resource set #$m_{1,1}$, Resource set #$m_{1,2}$ . . . Resource set #$m_{1,r1}$ |
| ... | ... |
| #j | Resource set #$m_{j,1}$, Resource set #$m_{j,2}$ . . . Resource set #$m_{j,rj}$ |
| ... | ... |
| #p | Resource set #$m_{p,1}$, Resource set #$m_{p,2}$ . . . Resource set #$m_{p,rp}$ | where, r1, r2, . . . , rp are integers greater than 1, and may be identical to or different from each other.

For example, three CORESETs needing to be detected, CORESET #1, CORESET #2 and CORESET #3, are configured for the UE, which are divided into two groups (p=2), such as dividing CORESET #1 and CORESET #2 into a group (with a second group index #1), and CORESET #3 is divided into a group (with a second group index #2); and additional resource sets configured for the first group CORESET #1 and CORESET #2 are Resource set #1, Resource set #2 and Resource set #3 (r1=3), and an additional resource set configured for the second group CORESET #3 is Resource set #3 (r2=1).

In an embodiment, after the additional resource sets are configured by the network side, the configured additional resource sets may be notified to the user equipment. For example, information on the additional resource sets may be transmitted to the user equipment via higher-layer signaling, such as radio resource control (RRC) signaling.

In an embodiment, an information element (IE) of the radio resource control signaling contains information on each control resource set or each group of control resource sets, and information on one or more additional resource sets configured corresponding to each control resource set or each group of control resources. The information is used to identify the control resource sets and the additional resource sets, for example, the information may be information for identifying positions of the control resource sets and the additional resource sets, such as the number and position of time-domain symbols (e.g. OFDM symbols), and resource block information in the frequency domain (e.g. a physical resource block (PRB) number, and a frequency offset), etc. And furthermore, the information may also include an index of a resource set.

In one embodiment, when one or more additional resource sets corresponding to each control resource set are configured, an IE format in the RRC is as shown in the following format (1):

CORESET #$m_1$, Resource set #$m_{1,1}$, #$m_{1,2}$, . . . , #$m_{1,k1}$,
CORESET #$m_2$, Resource set #$m_{2,1}$, #$m_{2,2}$, . . . , #$m_{2,2}$,
. . . .
CORESET #$m_n$, Resource set #$m_{n,1}$, #$m_{n,2}$, . . . , #$m_{n,kn}$.

Format (1) indicates that configured additional resource sets for CORESET #$m_1$ are Resource set #$m_{1,1}$, #$m_{1,2}$ . . . #$m_{1,k1}$, configured additional resource sets for CORESET #$m_2$ are Resource set #$m_{2,1}$, #$m_{2,2}$ . . . #$m_{2,k2}$, and configured additional resource sets for CORESET #$m_n$, are Resource set #$m_{n,1}$, #$m_{n,2}$ . . . #$m_{n,kn}$; where, n denotes the number of CORESETs configured for the UE, #mn denotes indices of the CORESETs, kn denotes the number of additional resource sets configured for a CORESET, and #$m_{n,1}$, #$m_{n,2}$ . . . #$m_{n,kn}$, denote indices of the additional resource sets.

It should be noted that in an IE, information on indices of the resource sets may not be included, and the above resource sets may be arranged by using a predetermined rule. For example, the IE may not include the indices of the CORESETs, and the above control resource sets and the additional resource sets corresponding thereto may be sequentially arranged according to an ascending or descending order of the indices; however, this embodiment is not limited thereto.

In one embodiment, when one or more additional resource sets corresponding to each group of control resource sets are configured, an IE format in the RRC is as shown in the following format (2):

CORESET #$m_1$, . . . , #$m_a$, Resource set #$m_{1,1}$, #$m_{1,2}$, . . . , #$m_{1,r1}$,
. . . .
CORESET #$m_b$, . . . , #$m_c$, Resource set #$m_{j,1}$, #$m_{j,2}$, . . . , #$m_{j,rj}$,
. . . .
CORESET #$m_d$, . . . , #$m_n$, Resource set #$m_{p,1}$, #$m_{p,2}$, . . . , #$m_{p,rp}$.

Format (2) indicates that n CORESETs are divided into p groups. Configured additional resource sets for a group of CORESETs #$m_1$, . . . , #$m_a$ are Resource set #$m_{1,1}$, #$m_{1,2}$ . . . #$m_{1,r1}$, configured additional resource sets for a group of CORESETs #$m_b$, . . . , #$m_c$ are Resource set #$m_{j,1}$, #$m_{j,2}$ . . . #$m_{j,rj}$, and configured additional resource sets for a group of CORESETs #$m_d$, . . . , #$m_n$, are Resource set #$m_{p,1}$, #$m_{p,2}$ . . . #$m_{p,rp}$; where, n denotes the number of CORESETs configured for the UE, #$m_n$ denotes indices of the CORESETs, rj denotes the number of additional resource sets configured for one group (with a second group index #j) of CORESETs, and #$m_{j,1}$, #$m_{j,2}$ . . . #$m_{j,rj}$ denote indices of the additional resource sets configured for the group #j.

It should be noted that in an IE, information on indices of the resource sets may not be included, and the above resource sets may be arranged by using a predetermined rule. For example, the IE may not include the indices of the CORESETs, and the above control resource sets and the additional resource sets corresponding thereto may be sequentially arranged according to an ascending or descending order of the second group indices of the p groups of CORESETs; however, this embodiment is not limited thereto. Alternatively, the IE may not include the indices of the CORESETs, but include indices of the second group where the CORESETs are located. For example, an IE format in the RRC is as shown in the following format (3):

CORESET (second group index #1), Resource set #$m_{1,1}$, #$m_{1,2}$, . . . , #$m_{1,s1}$,
. . . .
CORESET (second group index #j), Resource set #$m_{j,1}$, #$m_{j,2}$, . . . , #$m_{j,sj}$,
. . . .
CORESET (second group index #p), Resource set #$m_{p,1}$, #$m_{p,2}$, . . . , #$m_{p,sp}$.

The network side may notify the user equipment the second grouping information. When the user equipment receives the RRC information, it determines the additional resource sets configured for each group of CORESETs according to the IE therein, also may determine CORESETs in each CORESET group, and hence determine additional resource sets corresponding to each CORESET.

In an embodiment, the configured additional resource sets may obtain higher frequency efficiency and/or lower latency, and operations performed on these additional resource sets may further be indicated. Hence, in this embodiment, the method may further include:

step 202 (optional): the network device side configures indication information indicating operations performed on the additional resource sets, or indication information indicating operations performed on the control resource sets and the additional resource sets.

The executed operations include rate matching or data mapping. When the performed operations are data mapping, it indicates that a PDSCH scheduled by the UE may perform data mapping processing on the resource. And when the performed operations are rate matching, it indicates that the resource cannot be used by the UE for data mapping processing, and the scheduled PDSCH can only perform rate matching around the time-frequency position of the resource. For example, when the additional resource sets include PDCCHs detected by other UEs, operations performed on the additional resource sets may be rate matching; otherwise, they may be data mapping; however, this embodiment is not limited thereto. Reference may be made to the relevant art for particular operations of data mapping and rate matching, which shall not be described herein any further.

In an embodiment, the indication information may be transmitted via a physical downlink channel in the control resource sets, the indication information may be a second predetermined number of bits, and the indication may be performed in a bitmap manner.

When the indication information is used to indicate the operations performed on the additional resource sets, the second predetermined number is equal to the number of the additional resource sets corresponding to a control resource set or a group of control resource sets, or the second predetermined number is equal to a maximum value in the number of different additional resource sets corresponding to different control resource sets or different groups of control resource sets.—

Each bit in the second predetermined number of bits respectively indicate an operation performed on one or more additional resource sets configured corresponding to each control resource set or each group of control resource sets.

For example, for the additional resource set configured for the above format (1), for CORESET #$m_i$, the number of configured additional resource sets is ki, and the indication information is carried by downlink control information (DCI) of a PDCCH in CORESET #$m_i$. The number of bits of the indication information (the second predetermined number) is equal to ki, and each bit respectively indicates operations performed on Resource set #$mi_{,1}$, $m_{i,2}$ . . . #$m_{i,ki}$; or the number of bits of the indication information (the second predetermined number) is equal to a maximum value in k1, k2, . . . , ki, . . . , kn, thus, lengths of DCI of PDCCHs in each CORESET remain identical.

For example, for the additional resource set configured in the format (2) above, for the control resource set with a second group index #j, the indication information is carried by DCI of a PDCCH of the control resource set with the second group index #j. The number of bits of the indication information (the second predetermined number) is equal to rj, and each bit respectively indicates operations performed on Resource set #$m_{j,1}$, #$m_{j,2}$ . . . #$m_{j,rj}$; or the number of bits of the indication information (the second predetermined number) is equal to a maximum value in r1, r2, . . . , rj, . . . , rp, thus, lengths of DCI of PDCCHs in each CORESET remain identical. For the additional resource sets configured for above format (2), its indication mode is similar to format (2), which shall not be described herein any further.

When the indication information is used to indicate operations performed on the control resource sets and the additional resource sets, the second predetermined number is equal to the number of the additional resource sets corresponding to each control resource set or each group of control resource sets plus 1, or is equal to the number of the corresponding additional resource sets plus the number of control resource sets in a group of control resource sets, or the second predetermined number is equal to a maximum value in the number of different additional resource sets corresponding to different control resource sets or different groups of control resource sets plus 1, or is equal to a maximum value in the number of different additional resource sets plus the number of control resource sets in a group of control resource sets.

Each bit in the second predetermined number of bits respectively correspondingly indicates operations performed on each control resource set or each group of control resource sets and the one or more additional resource sets configured corresponding to each control resource set or each group of control resource sets.

For example, for the additional resource set configured for the above format (1), for CORESET #$m_i$, the number of configured additional resource sets is ki, the indication information is carried by DCI of a PDCCH in CORESET #$m_i$, the number of bits of the indication information (the second predetermined number) is equal to ki+1, and each bit respectively indicates operations performed on CORESET #$m_i$, Resource set #$m_{i,1}$, #$m_{i,2}$ . . . #$m_{i,ki}$; or the number of bits of the indication information (the second predetermined number) is equal to a maximum value in k1, k2, . . . ki, . . . , kn plus 1, thus, lengths of DCI of PDCCHs in each CORESET remain identical.

For example, for the additional resource set configured for the above format (2), for CORESETs with the second group index #j, the indication information is carried by DCI of a PDCCH in the CORESETs with the second group index #j, the number of bits of the indication information (the second predetermined number) is equal to rj+x, x being equal to the number of the CORESETs with the second group index #j, and each bit respectively indicates operations performed on CORESET #$m_b$, . . . , #$m_c$, Resource set #$m_{j,1}$, #$m_{j,2}$ . . . #$m_{j,rj}$; or the number of bits of the indication information (the second predetermined number) is equal to a maximum value in r1, r2, . . . , rp plus x, thus, lengths of DCI of PDCCHs in each CORESET remain identical.

For example, for the additional resource set configured for the above format (3), for CORESETs with the second group index #j, the indication information is carried by DCI of a PDCCH in the CORESETs with the second group index #j, the number of bits of the indication information (the second predetermined number) is equal to sj+1, and each bit respectively indicates operations performed on the CORESETs with the second group index #j (indicating that operations performed on intra-group CORESETs are identical), Resource set #$m_{j,1}$, #$m_{j,2}$ . . . #$m_{j,sj}$; or the number of bits of the indication information (the second predetermined number) is equal to a maximum value in s1, s2, . . . , sj, . . . , sp plus 1, thus, lengths of DCI of PDCCHs in each CORESET remain identical.

As described above, when the second predetermined number is determined according to the maximum value, it may be greater than the number P of additional resource sets configured for its control resource set, and operations performed on the additional resource sets or on the control resource sets and the additional resource sets may be respectively indicated according to P bits or P+1 or P+x bits in the second predetermined number of bits.

Figure 4:
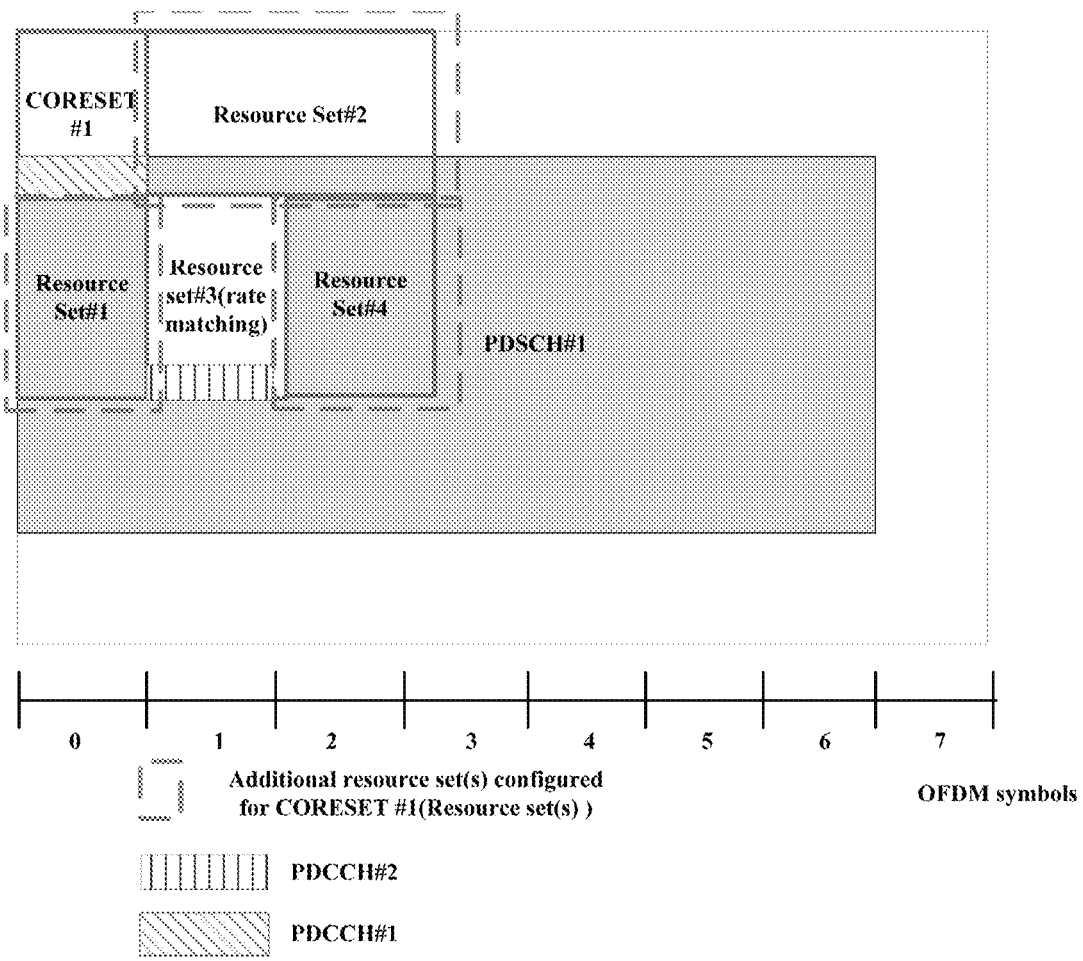

FIG. 4 is a schematic diagram of the configured additional resource sets. As shown in FIG. 4, the configured additional resource sets corresponding to CORESET #1 are Resource set #1, Resource set #2, Resource set #3 and Resource set #4, and the indication information is configured to respectively indicate operations performed on CORESET #1, Resource set #1, Resource set #2, Resource set #3 and Resource set #4. The indication information is transmitted via downlink control information of PDCCH #1 detected in CORESET #1.

For example, the indication information is 5-bits, and each bit respectively correspondingly indicates operations performed on CORESET #1, Resource set #1, Resource set #2, Resource set #3 and Resource set #4 in turn; where, "0" denotes data mapping, and "1" denotes rate matching; however, this embodiment is not limited thereto, and vice versa.

As shown in FIG. 4, as PDCCH #2 exists in Resource set #3, the operation performed on Resource set #3 is "rate matching", and the operations performed on other resource sets are "data mapping", the 5-bits indication information may be expressed as 00010.

It should be noted that this embodiment is not limited thereto. For example, the CORESET may use a predetermined default operation, the indication information may be 4-bits, each bit respectively indicates operations performed on Resource set #1, Resource set #2, Resource set #3 and Resource set #4, and the 4-bits indication information may be expressed as 0010.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 2

Figure 5:
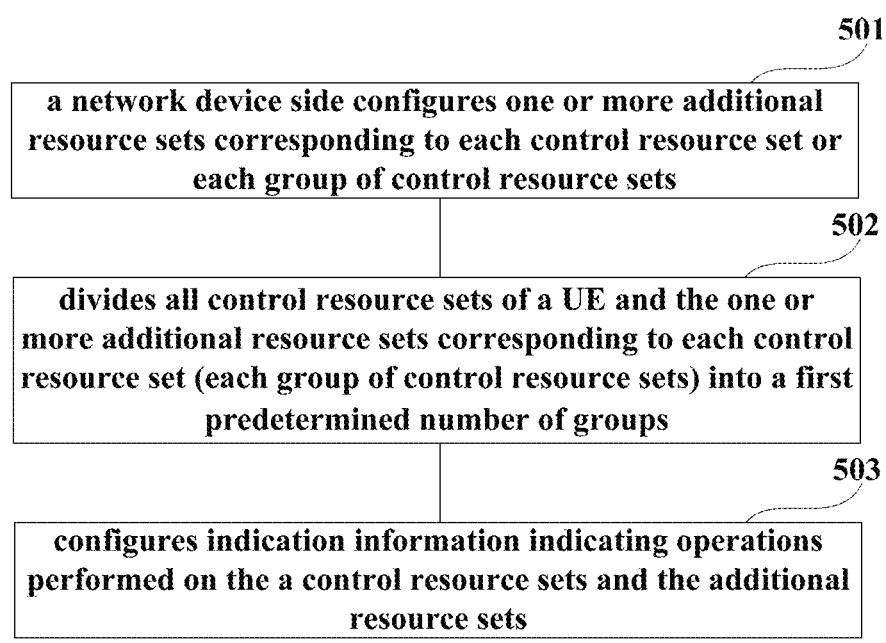

FIG. 5 is a flowchart of the resource configuration method in Embodiment 2, which is applicable to a network device side. As shown in FIG. 5, the method includes:

step 501: a network device side configures one or more additional resource sets corresponding to each control resource set or each group of control resource sets.

In an embodiment, particular implementation of step 501 is identical to that of step 201, which shall not be described herein any further. What is different from Embodiment 1 is that in this embodiment, the method further includes:

step 502: the network device side divides all control resource sets of a UE and the one or more additional resource sets corresponding to each control resource set into a first predetermined number of groups; or divides all control resource sets of UE and the one or more additional resource sets corresponding to each group of control resource sets are divided into a first predetermined number of groups.

In one embodiment, all the control resource sets of the UE and the one or more additional resource sets corresponding to each control resource set are divided into the first predetermined number of groups. For example, for the resource allocation mode in Table 1 above, all the total n+k1+k2+ . . . +kn resource sets in Table 1, CORESET #1, CORESET #$m_2$, . . . , CORESET #$m_n$, Resource set #$m_{1,1}$, #$m_{1,2}$, . . . #$m_{1,k1}$, Resource set #$m_{2,1}$, #$m_{2,2}$ . . . #$m_{2,k2}$, . . . , Resource set #$m_{n,1}$, #$m_{n,2}$ . . . #$m_{n,kn}$, are divided into a first predetermined number q groups.

In another embodiment, all the control resource sets of the UE and the one or more additional resource sets corresponding to each group of control resource sets are divided into a first predetermined number of groups. For example, for the resource allocation mode in Table 3 above, all the total n+r1+r2+ . . . +rj . . . +rp resource sets in Table 3, CORESET #$m_2$, CORESET #$m_2$, . . . , CORESET #$m_n$, Resource set #$m_{1,1}$, #$m_{1,2}$, . . . #$m_{1,r1}$, . . . , Resource set #$m_{p,1}$, #$m_{p,2}$ . . . #$m_{p, rp}$, are divided into a first predetermined number q groups.

In an embodiment, the grouping may be performed according to different initial symbols and sizes of the CORESETs in step 502. However, this embodiment is not limited thereto, and each group may include only the control resource sets or only the additional resource sets, or include control resource sets and additional resource sets, and the numbers of control resource sets and/or additional resource sets contained in the groups may be identical or different. First group indices of the groups are #1, #2, . . . , #q, respectively, and the first predetermined quantity q may be determined as demanded; however, this embodiment is not limited thereto.

In an embodiment, the method may further include (not shown): notifying the user equipment of the configured additional resource sets. For example, information on the additional resource sets may be transmitted to the user equipment via higher-layer signaling, such as radio resource control (RRC) signaling.

An information element of the radio resource control signaling includes information on each control resource set or each group of control resource sets, and information on one or more additional resource sets configured corresponding to each control resource set or each group of control resource sets. Reference may be made to Embodiment 1 for particular contents of the information, and reference may be made to Embodiment 1 for particular formats of the information element thereof, such as those as shown in format (1), format (2), and format (3), which shall not be described herein any further.

In an embodiment, the information element may further include a first group index of a group where each control resource set or each group of control resource sets after being divided in step 502 is located, and a first group index of a group where the one or more additional resource sets configured corresponding to each control resource set or each group of control resource sets is/are located.

For example, in format (1) of Embodiment 1, first group indices may further be included, which are as shown below:

CORESET #$m_1$ (a first group index #1), Resource set #$m_{1,1}$ (a first group index #1), #$m_{1,2}$ (a first group index #z), . . . , #$m_{1,k1}$ (a first group index #q);

CORESET #$m_2$ (a first group index #2), Resource set #$m_{2,1}$ (a first group index #3), #$m_{2,2}$ (a first group index #4), . . . , #$m_{2,k2}$ (a first group index #q−1);
. . . ;

CORESET #$m_n$ (a first group index #3), Resource set #$m_{n,1}$ (a first group index #4), #$m_{n,2}$ (a first group index #t), . . . , #$m_{n,kn}$ (a first group index #q).

For example, in format (2) of Embodiment 1, first group indices may further be included, which are as shown below:

CORESET #$m_1$ (a first group index #1), . . . , #$m_a$ (a first group index #2), Resource set #$m_{1,1}$ (a first group index #1), #$m_{1,2}$ (a first group index #1), . . . , #$m_{1,r1}$ (a first group index #1),
. . . ;

CORESET #$m_b$ (a first grouping index #2), . . . , #$m_c$ (a first grouping index #3), Resource set #$m_{j,1}$ (a first grouping index #3), #$m_{j,2}$ (a first grouping index #3), . . . , #$m_{j,rj}$ (a first group index #3),
. . . ;

CORESET #$m_d$ (a first group index #t), . . . , #$m_n$ (a first group index #z), Resource set #$m_{p,1}$ (a first group index #q−1), #$m_{p,2}$ (a first group index #q), . . . , #$m_{p,rp}$ (a first group index #q).

For example, in format (3) of Embodiment 1, group indices may also be included, which are as shown below:

CORESET (a second group index #1) (a first group index #1), Resource set #$m_{1,1}$ (a first group index #1), #$m_{1,2}$ (a first group index #2), . . . , #$m_{1,s1}$ (a first group index #3),
. . . ;

CORESET (a second group index #j) (a first group index #t), Resource set #$m_{j,1}$ (a first group index #1), #$m_{j,2}$ (a first group index #z), . . . , #$m_{j,sj}$ (a first group index #t),
. . . ;

CORESET (a second group index #p) (a first group index #q), Resource set #$m_{p,1}$ (a first group index #3), #$m_{p,2}$ (a first group index #t), . . . , #$m_{p,sp}$ (a first group index #q).

The above indices 1, 2, 3, z, t, q−1, q of the first group where each resource set is located are examples only, and this embodiment is not limited thereto.

In an embodiment, the method may further include:

step 503: the network device side configures indication information indicating operations performed on the control resource sets and the additional resource sets.

In step 503, the indication information corresponding to groups may be respectively configured for the first predetermined number of groups divided in step 502. As the indication information is configured for the groups, the operations performed on all resource sets in the group are identical, which may further reduce the overhead of DCI and reduce the length of the bitmap.

In an embodiment, particular meanings of the operations are as described in Embodiment 1, which shall not be described herein any further.

In an embodiment, the indication information may be transmitted via a physical downlink channel in the control resource sets; the indication information may be a second predetermined number of bits, and may be indicated in by a bitmap; the second predetermined number is equal to the first predetermined number, each bit of the second predetermined number of bits is used to indicate operations performed on a resource set in the first predetermined number of groups, and the second predetermined number of bits respectively one by one correspond to the group indices.

For example, q bits are used to indicate operations performed on q groups of resource sets, that is, a first bit in q bits indicates an operation performed on a resource set with a first group index #1, a second bit indicates an operation performed on a resource set with a first group index #2, and a q-th bit indicates an operation performed on a resource set with a first group index #q; each bit may use 0 and 1 to respectively indicate that operations performed are data mapping or rate matching, and vice versa, and this embodiment is not limited thereto.

For example, the indication information is 010 . . . 1 and has total q bits, indicating that operations performed on the resource set with a first group index #1 are data mapping, operations performed on the resource set with a first group index #2 are rate mapping, operations performed on the resource set with a first group index #3 are data mapping, . . . , and operations performed on the resource set with a first group index #q are rate mapping.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 3

Figure 6:
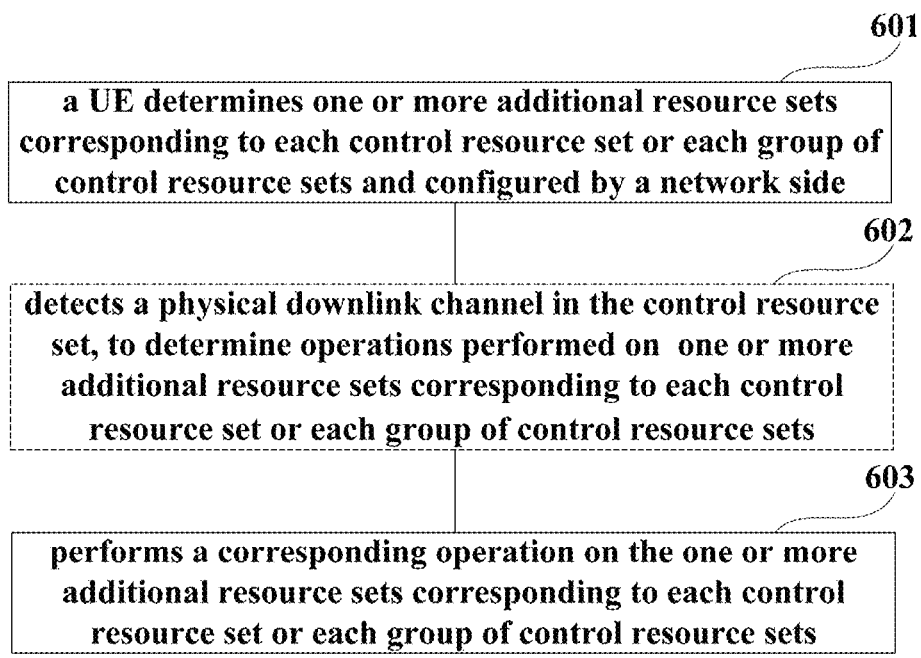

FIG. 6 is a flowchart of the resource determination method in Embodiment 3, which is applicable to a user equipment side. As shown in FIG. 6, the method includes:

step 601: a user equipment determines one or more additional resource sets configured by a network side and corresponding to each control resource set or each group of control resource sets; and step 603: the user equipment performs a corresponding operation on the one or more additional resource sets corresponding to each control resource set or each group of control resource sets.

In an embodiment, before step 601, the method may further include (not shown): receiving information on the additional resources sets notified by the network device via RRC, reference being able to be made to embodiments 1 and 2 for a format of an information element in the RRC, which shall not be described herein any further.

In an embodiment, in step 601, the one or more additional resource sets corresponding to each control resource set or each group of control resource sets configured by the network side may be determined according to the received RRC, reference being able to be made to Embodiment 1 for a particular configuration mode thereof, which shall not be described herein any further.

In an embodiment, the method may further include:

step 602 (optional): the user equipment detects a physical downlink channel in the control resource set, to determine operations performed on the one or more additional resource sets corresponding to each control resource set or each group of control resource sets;

and in step 603, a corresponding operation is performed on the additional resource sets according to the operations determined in step 602.

In an embodiment, in step 602, DCI is received by detecting the PDCCH. The DCI includes indication information indicating operations performed on the one or more additional resource sets, and according to the indication information and the format of the information element in the RRC, the operations performed on the one or more additional resource sets corresponding to each control resource set or each group of control resource sets may be determined. Reference may be made to Embodiment 1 or 2 for a particular implementation of the indication information, which shall not be described herein any further.

In an embodiment, in step 602, the operations performed on each control resource set or each group of control resource sets may also be determined. And in step 603, corresponding operations may also be performed on each control resource set or each group of control resource sets.

In an embodiment, when the operations performed are determined as being data mapping, PDSCH data are mapped to time-frequency positions of the additional resource sets and are transmitted; and when the operations performed are determined as being rate matching, the time-frequency positions of the additional resource sets are vacated and rate matching is performed around the time-frequency positions, that is, scheduling data contain the additional resource sets, but in assembling transport blocks (TBs), resource blocks at the time-frequency positions of the additional resource sets need to be vacated.

In an embodiment, the UE may detect PDCCHs in the control resource sets so as to obtain its own RMSI scheduling information, and reference may be made to existing techniques for a particular method. For example, the user side determines a particular data resource by detecting the PDCCHs, and receives data to obtain its own RMSI scheduling information.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 4

Embodiment 4 provides a resource configuration apparatus. As a principle of the apparatus for solving problems is similar to that of the method in Embodiment 1, reference may be made to the implementation of the method in Embodiment 1 for implementation of the apparatus, with identical contents being not going to be described herein any further.

Figure 7:
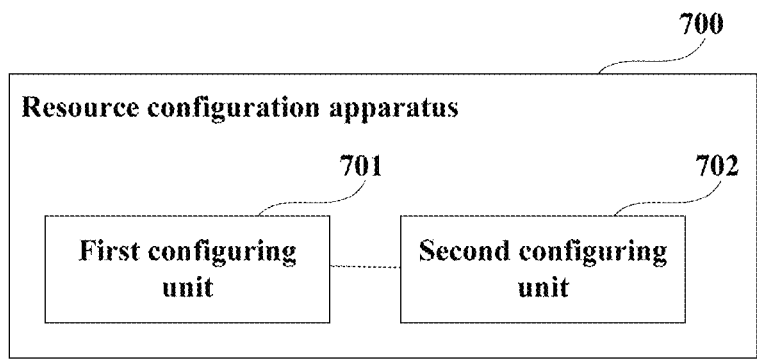

FIG. 7 is a schematic diagram of the resource configuration apparatus in Embodiment 4. As shown FIG. 7, a resource configuration apparatus 700 includes:

a first configuring unit 701 configured to configure one or more additional resource sets corresponding to each control resource set or each group of control resource sets.

In an embodiment, the apparatus may further include:

a second configuring unit 702 (optional) configured to configure indication information indicating operations performed on the additional resource sets, or indication information indicating operations performed on the control resource sets and the additional resource sets.

In an embodiment, the indication information may be transmitted via a physical downlink channel in the control resource sets, the indication information may be a second predetermined number of bits, and the indication may be performed in a bitmap manner.

In one embodiment, when the indication information is used to indicate the operations performed on the additional resource sets, the second predetermined number is equal to the number of the additional resource sets corresponding to a control resource set or a group of control resource sets, or the second predetermined number is equal to a maximum value in the number of different additional resource sets corresponding to different control resource sets or different groups of control resource sets.

Each bit in the second predetermined number of bits respectively indicates an operation performed on one or more additional resource sets configured corresponding to each control resource set or each group of control resource sets.

In one embodiment, when the indication information is used to indicate operations performed on the control resource sets and the additional resource sets, the second predetermined number is equal to the number of the additional resource sets corresponding to each control resource set or each group of control resource sets plus 1, or is equal to the number of the corresponding additional resource sets plus the number of control resource sets in a group of control resource sets, or the second predetermined number is equal to a maximum value in the number of different additional resource sets corresponding to different control resource sets or different groups of control resource sets plus 1, or is equal to a maximum value in the number of different additional resource sets plus the number of control resource sets in a group of control resource sets.

Each bit at a predetermined position in the second predetermined number of bits respectively correspondingly indicates operations performed on each control resource set or each group of control resource sets and the one or more additional resource sets configured corresponding to each control resource set or each group of control resource sets.

In an embodiment, reference may be made to steps 201-202 in Embodiment 1 for particular implementations of the first configuring unit 701 and the second configuring unit 702, which shall not be described herein any further.

In an embodiment, the apparatus may further include:

a first transmitting unit (not shown) configured to notify the UE of the configured additional resource sets via radio resource control signaling.

An information element in the radio resource control signaling includes information of each control resource set or each group of control resource sets and information of one or more additional resource sets configured corresponding to each control resource set or each group of control resource sets. And reference may be made to Embodiment 1 for a particular format of the information element, which shall not be described herein any further.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 5

This embodiment provides a network device (not shown), including the above resource configuration apparatus 700 described above, and a structure and functions of the resource configuration apparatus being as described in Embodiment 4, which shall not be described herein any further.

Embodiment 5 further provides a network device. As a principle of the device for solving problems is similar to that of the method in Embodiment 1, reference may be made to the implementation of the method in Embodiment 1 for implementation of the device, with identical contents being not going to be described herein any further.

Figure 8:
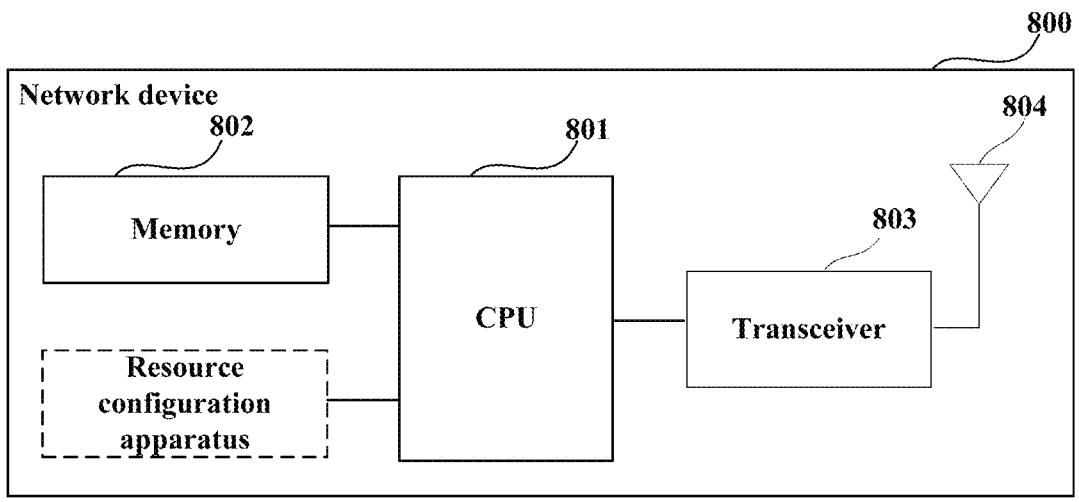

FIG. 8 is a schematic diagram of a structure of the network device of the embodiment of this disclosure. As shown in FIG. 8, a network device 800 may include a central processing unit 801 (CPU) and a memory 802, the memory 802 being coupled to the central processing unit 801. The memory 802 may store various data, and furthermore, it may store a program for data processing, and execute the program under control of the central processing unit 801, so as to transmit related information.

In one embodiment, the functions of the apparatus 700 may be integrated into the central processing unit 801, the central processing unit 801 may be configured to carry out the resource configuration method described in Embodiment 1.

For example, the central processing unit 801 may be configured to: configure one or more additional resource sets corresponding to each control resource set or each group of control resource sets.

The central processing unit 801 may further be configured to: configure indication information indicating operations performed on the control resource sets and the additional resource sets.

The central processing unit 801 may further be configured to: notify the UE of the configured additional resource sets via radio resource control signaling.

Furthermore, reference may be made to Embodiment 1 for particular configuration manner of the central processing unit 801, which shall not be described herein any further.

In another embodiment, the apparatus 700 and the central processing unit 801 may be configured separately; for example, the apparatus 700 may be configured as a chip connected to the central processing unit 801, such as the units shown in FIG. 8, and the functions of the apparatus 700 are executed under control of the central processing unit 801.

Furthermore, as shown in FIG. 8, the network device 800 may further include a transceiver 803, and an antenna 804, etc.; functions of the above components are similar to those in the relevant art, which shall not be described herein any further. It should be noted that the network device 800 does not necessarily include all the parts shown in FIG. 8, and furthermore, the network device 800 may include parts not shown in FIG. 8, and the relevant art may be referred to.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 6

Embodiment 6 provides a resource configuration apparatus. As a principle of the apparatus for solving problems is similar to that of the method in Embodiment 2, reference may be made to the implementation of the method in Embodiment 2 for implementation of the apparatus, with identical contents being not going to be described herein any further.

Figure 9:
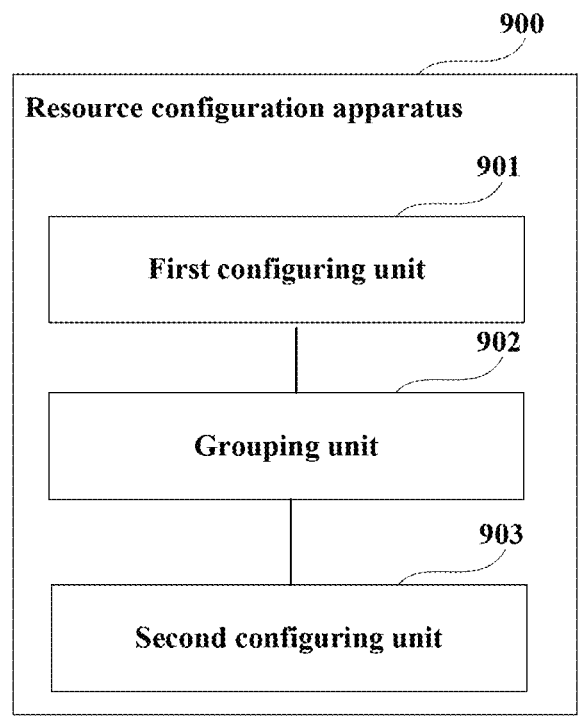

FIG. 9 is a schematic diagram of a structure of the resource configuration apparatus of this embodiment. As shown FIG. 9, a resource configuration apparatus 900 includes:

a first configuring unit 901 configured to configure one or more additional resource sets corresponding to each control resource set or each group of control resource sets.

In an embodiment, the apparatus 900 further includes:

a grouping unit 902 configured to divide all control resource sets of UE and the one or more additional resource sets corresponding to each control resource set into a first predetermined number of groups;

or configured to divide all control resource sets of UE and the one or more additional resource sets corresponding to each group of control resource sets into a first predetermined number of groups; and a second configuring 903 unit configured to configure indication information indicating operations on the control resource sets and the additional resource sets.

The indication information is transmitted via a physical downlink channel in the control resource sets, the indication information being a second predetermined number of bits, and the second predetermined number being equal to the first predetermined number.

Each bit in the second predetermined number of bits respectively correspondingly indicates operations performed on each control resource set or each group of control resource sets and the one or more additional resource sets configured corresponding to each control resource set or each group of control resource sets.

In an embodiment, reference may be made to steps 501-503 for particular implementations of the first configuring unit 901, the grouping unit 902 and the second configuring unit 903, which shall not be described herein any further.

In an embodiment, the apparatus may further include:

a first transmitting unit (not shown) configured to notify the UE of the configured additional resource sets via radio resource control signaling.

An information element in the radio resource control signaling includes information of each control resource set or each group of control resource sets and information of one or more additional resource sets configured corresponding to each control resource set or each group of control resource sets.

The information element further includes a first group index of a group where each control resource set or each group of control resource sets is located and a first group index of a group where one or more additional resource sets configured corresponding to each control resource set or each group of control resource sets is/are located.

Reference may be made to Embodiment 2 for a particular format of the information element, which shall not be described herein any further.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 7

This embodiment provides a network device (not shown), including the above resource configuration apparatus 900 described above, and a structure and functions of the resource configuration apparatus being as described in Embodiment 6, which shall not be described herein any further.

Embodiment 7 further provides a network device. As a principle of the device for solving problems is similar to that of the method in Embodiment 2, reference may be made to the implementation of the method in Embodiment 2 for implementation of the device, with identical contents being not going to be described herein any further.

Figure 10:
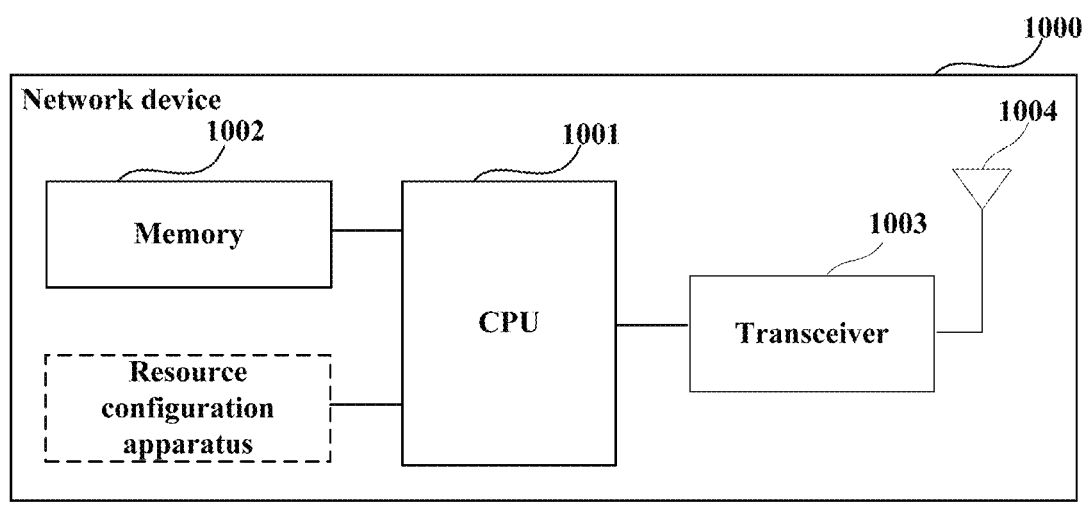

FIG. 10 is a schematic diagram of a structure of the network device of the embodiment of this disclosure. As shown in FIG. 10, a network device 1000 may include a central processing unit 1001 (CPU) and a memory 1002, the memory 1002 being coupled to the central processing unit 1001. The memory 1002 may store various data, and furthermore, it may store a program for data processing, and execute the program under control of the central processing unit 1001, so as to transmit related information.

In one embodiment, the functions of the apparatus 900 may be integrated into the central processing unit 1001, the central processing unit 1001 may be configured to carry out the resource configuration method described in Embodiment 2.

For example, the central processing unit 1001 may be configured to: configure one or more additional resource sets corresponding to each control resource set or each group of control resource sets.

The central processing unit 1001 may further be configured to: divide all control resource sets of UE and the one or more additional resource sets corresponding to each control resource set into a first predetermined number of groups;

or divide all control resource sets of UE and the one or more additional resource sets corresponding to each group of control resource sets into a first predetermined number of groups.

The central processing unit 1001 may further be configured to: configure indication information indicating operations performed on the control resource sets and the additional resource sets.

The central processing unit 1001 may further be configured to: notify the UE of the configured additional resource sets via radio resource control signaling.—Furthermore, reference may be made to Embodiment 2 for particular configuration manner of the central processing unit 1001, which shall not be described herein any further.

In another embodiment, the apparatus 900 and the central processing unit 1001 may be configured separately; for example, the apparatus 900 may be configured as a chip connected to the central processing unit 1001, such as the units shown in FIG. 10, and the functions of the apparatus 900 are executed under control of the central processing unit 1001.

Furthermore, as shown in FIG. 10, the network device 1000 may further include a transceiver 1003, and an antenna 1004, etc.; functions of the above components are similar to those in the relevant art, which shall not be described herein any further. It should be noted that the network device 1000 does not necessarily include all the parts shown in FIG. 10, and furthermore, the network device 1000 may include parts not shown in FIG. 10, and the relevant art may be referred to.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 8

Embodiment 8 provides a resource determination apparatus. As a principle of the apparatus for solving problems is similar to that of the method in Embodiment 3, reference may be made to the implementation of the method in Embodiment 3 for implementation of the apparatus, with identical contents being not going to be described herein any further.

FIG. 11 is a schematic diagram of a structure of the resource determination apparatus of this embodiment. As shown in FIG. 11, a resource determination apparatus 1100 includes:

a first determining unit 1101 configured to determine one or more additional resource sets configured by a network side and corresponding to each control resource set or each group of control resource sets; and a processing unit 1102 configured to perform a corresponding operation on the one or more additional resource sets corresponding to each control resource set or each group of control resource sets.

In an embodiment, the apparatus 1100 may further include:

a second determining unit 1103 configured to detect a physical downlink channel in the control resource set, so as to determine operations performed on each control resource set or each group of control resource sets and the one or more additional resource sets corresponding to each control resource set or each group of control resource sets;

and the processing unit 1102 performs a corresponding operation on the additional resource sets according to the operations determined by the determining unit.

In an embodiment, reference may be made to steps 601-603 in Embodiment 3 for particular implementations of the first determining unit 1101, the processing unit 1102 and the second determining unit 1103, which shall not be described herein any further.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 9

This embodiment provides a user equipment (not shown), including the above resource determination apparatus 1100 described above, and a structure and functions of the resource determination apparatus being as described in Embodiment 8, which shall not be described herein any further.

Embodiment 9 further provides a user equipment. As a principle of the user equipment for solving problems is similar to that of the method in Embodiment 3, reference may be made to the implementation of the method in Embodiment 3 for implementation of the user equipment, with identical contents being not going to be described herein any further.

FIG. 12 is a schematic diagram of a structure of the user equipment of this embodiment. As shown in FIG. 12, a user equipment 1200 may include a central processing unit 1201 (CPU) and a memory 1202, the memory 1202 being coupled to the central processing unit 1201. The memory 1202 may store various data, and furthermore, it may store a program for data processing, and execute the program under control of the central processing unit 1201, so as to receive related information.

In one embodiment, the functions of the apparatus 1100 may be integrated into the central processing unit 1201, the central processing unit 1201 may be configured to carry out the resource determination method described in Embodiment 3.

The central processing unit 1201 may be configured to: determine one or more additional resource sets configured by a network side and corresponding to each control resource set or each group of control resource sets, and perform a corresponding operation on the one or more additional resource sets corresponding to each control resource set or each group of control resource sets.

The central processing unit 1201 may further be configured to: detect a physical downlink channel in the control resource set, so as to determine operations performed on each control resource set or each group of control resource sets and the one or more additional resource sets corresponding to each control resource set or each group of control resource sets, and perform a corresponding operation on the additional resource sets according to the operations determined by the determining unit.

Furthermore, reference may be made to Embodiment 3 for particular configuration manner of the central processing unit 1201, which shall not be described herein any further.

In another embodiment, the apparatus 1100 and the central processing unit 1201 may be configured separately; for example, the apparatus 1100 may be configured as a chip connected to the central processing unit 1201, such as the units shown in FIG. 12, and the functions of the apparatus 1100 are executed under control of the central processing unit 1201.

Furthermore, as shown in FIG. 12, the user equipment 1200 may include a communication module 1203, an input unit 1204, a display 1206, an audio processor 1205, an antenna 1207, and a power supply 1208, etc.; functions of the above components are similar to those in the relevant art, which shall not be described herein any further. It should be noted that the user equipment 1200 does not necessarily include all the parts shown in FIG. 12; and furthermore, the user equipment 1200 may include parts not shown in FIG. 12, and the relevant art may be referred to.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

Embodiment 10

This embodiment provides a communication system.

FIG. 13 is a schematic diagram of the communication system in Embodiment 10. As shown in FIG. 10, a communication system 1300 includes a network device 1301 and a user equipment 1302.

Reference may be made to the network device 800 or 1000 in Embodiment 5 or 7 for particular implementation of the network device 1301, and reference may be made to the user equipment 1200 in Embodiment 9 for particular implementation of the user equipment 1302, the contents of which being incorporated herein and being not going to be described herein any further.

FIG. 14 is a flowchart of a resource configuration and determination method in Embodiment 10. As shown in FIG. 14, the method includes:

step 1401: configuring control resource sets, and configuring one or more additional resource sets corresponding to each control resource set or each group of control resource sets;

step 1402: configuring indication information indicating operations performed on the control resource sets and the additional resource sets;

step 1403: notifying the user equipment of the configured additional resource sets; for example, the information on the additional resource sets may be carried by RRC signaling, reference being able to be made to Embodiment 1 for a particular format of the RRC signaling, which shall not be described herein any further;

step 1404: determining CORESETs configured by a network side therefor and corresponding additional resource sets;

step 1405: detecting a PDCCH in the configured control resource sets, and determining operations performed on each control resource set and a corresponding additional resource set;

step 1406: performing a corresponding operation on resources in each control resource set and a corresponding additional resource set according to the determined operations.

In an embodiment, reference may be made to steps 201-202 in Embodiment 1 and steps 601-603 in Embodiment 3 for particular implementations of steps 1401-1406, which shall not be described herein any further.

FIG. 15 is a flowchart of the resource configuration and determination method in Embodiment 10. As shown in FIG. 15, the method includes:

step 1501: configuring control resource sets, and configuring one or more additional resource sets corresponding to each control resource set or each group of control resource sets;

step 1502: dividing all control resource sets and the configured one or more additional resource sets into a first predetermined number of groups;

step 1503: configuring indication information indicating operations performed on the resource sets in the groups of resource sets;

step 1504: notifying the user equipment of the configured additional resource sets; for example, the information on the additional resource sets may be carried by RRC signaling, reference being able to be made to Embodiment 1 for a particular format of the RRC signaling, which shall not be described herein any further;

step 1505: determining CORESETs configured by a network side therefor and corresponding additional resource sets;

step 1506: detecting a PDCCH in the configured control resource sets, and determining operations performed on resource sets in each group of resource sets, so as to determine operations performed on each control resource set and a corresponding additional resource set;

step 1507: performing a corresponding operation on each control resource set and the corresponding additional resource set according to the determined operations.

In an embodiment, reference may be made to steps 501-503 in Embodiment 2 and steps 601-603 in Embodiment 3 for particular implementations of steps 1501-1507, which shall not be described herein any further.

It can be seen from the above embodiments that by configuring one or more additional resource sets corresponding to each control resource set or each group of control resource sets, that is, by specifically configuring additional resource sets for the control resource sets, payload of downlink control information may be reduced, and currently existed problems may be solved.

An embodiment of the present disclosure provides a computer storage medium, including a computer readable program code, which will cause a resource configuration apparatus or a network device to carry out the resource configuration method described in Embodiment 1 or 2.

An embodiment of the present disclosure provides a computer readable program code, which, when executed in a resource configuration apparatus or a network device, will cause the resource configuration apparatus or the network device to carry out the resource configuration method described in Embodiment 1 or 2.

An embodiment of the present disclosure provides a computer storage medium, including a computer readable program code, which will cause a resource determination apparatus or a user equipment to carry out the resource determination method described in Embodiment 3.

An embodiment of the present disclosure provides a computer readable program code, which, when executed in a resource determination apparatus or a user equipment, will cause the resource determination apparatus or the user equipment to carry out the resource determination method described in Embodiment 3.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods carried out in the apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 7-13 may either correspond to software modules of procedures of a computer program, or correspond to hardware modules. Such software modules may respectively correspond to the steps shown in FIGS. 2, 5-6 and 14-15. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 7-13 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 7-13 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A resource configuration apparatus, comprising:
a controller configured to configure one or more resource sets corresponding to one group of control resource sets; and
a transmitter configured to transmit indication information indicating whether the resource sets are available for data transmission, the indication information comprises a predetermined number of bits,
wherein, one bit at a predetermined position in the indication information correspondingly indicates whether the one or more resource sets, which are configured corresponding to one group of control resource sets, are available for data transmission; and
wherein the controller further configured to divide all control resource sets of a user equipment (UE) and the one or more resource sets corresponding to the group of control resource sets into a first predetermined number of groups.

2. The apparatus according to claim 1, wherein the transmitter is further configured to transmit to a UE, a radio resource control signaling comprising configuration information that comprises information on one or more resource sets corresponding to one group of control resource sets.

3. The apparatus according to claim 2, wherein an information element in the radio resource control signaling comprises information of the group of control resource sets and information of one or more resource sets configured corresponding to the group of control resource sets.

4. The apparatus according to claim 3, wherein the information element further comprises a first group index of a group where the group of control resource sets is located and a first group index of a group where one or more resource sets configured corresponding to the group of control resource sets is/are located.

5. The apparatus according to claim 1, wherein the indication information is transmitted via a physical downlink channel in the control resource sets.

6. The apparatus according to claim 1, wherein the predetermined number is equal to the number of the resource sets corresponding to the group of control resource sets.

7. A resource determination apparatus, comprising:
a controller configured to determine one or more resource sets corresponding to one group of control resource sets and configured by a network side; and
a receiver configured to receive indication information indicating whether the resource sets are available for data transmission, the indication information comprises a predetermined number of bits,
wherein, one bit at a predetermined position in the indication information correspondingly indicates whether the one or more resource sets, which are configured corresponding to one group of control resource sets, are available for data transmission; and
wherein, all control resource sets of a user equipment (UE) and the one or more resource sets corresponding to the group of control resource sets are divided into a first predetermined number of groups.

8. The apparatus according to claim 7, wherein the controller further configured to detect a physical downlink channel in the control resource set, to determine whether one or more resource sets, which are configured corresponding to the group of control resource sets, are available for data transmission; and
perform a corresponding operation on the resource sets according to a determined result.

9. A resource configuration method, comprising:
configuring one or more resource sets corresponding to one group of control resource sets; and
transmitting indication information indicating whether the resource sets are available for data transmission, the indication information comprises a predetermined number of bits,
wherein, one bit at a predetermined position in the indication information correspondingly indicates whether the one or more resource sets, which are configured corresponding to one group of control resource sets, are available for data transmission; and
wherein the method further comprises:
dividing all control resource sets of a user equipment and the one or more resource sets corresponding to the group control resource sets into a first predetermined number of groups.

10. The method according to claim 9, wherein the method further comprises:
transmitting to a user equipment, a radio resource control signaling comprising configuration information that comprises information on one or more resource sets corresponding to one group of control resource sets.

11. The method according to claim 10, wherein an information element in the radio resource control signaling comprises information of the group of control resource sets and information of one or more resource sets configured corresponding to the group of control resource sets.

12. The method according to claim 11, wherein the information element further comprises a group index of a group where the group of control resource sets is located and a group index of a group where one or more resource sets configured corresponding to the group of control resource sets is/are located.

13. The method according to claim 9, wherein the indication information is transmitted via a physical downlink channel in the control resource sets.

* * * * *